(12) United States Patent
Togano et al.

(10) Patent No.: US 10,378,794 B2
(45) Date of Patent: Aug. 13, 2019

(54) APPARATUS AND METHOD FOR EVALUATING PERFORMANCE OF CENTRIFUGAL CHILLER

(75) Inventors: Yoshie Togano, Tokyo (JP); Kenji Ueda, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 1330 days.

(21) Appl. No.: 13/557,874

(22) Filed: Jul. 25, 2012

(65) Prior Publication Data

US 2013/0031920 A1 Feb. 7, 2013

(30) Foreign Application Priority Data

Aug. 4, 2011 (JP) .................................. 2011-171152

(51) Int. Cl.
*F25B 49/02* (2006.01)
*F25B 1/00* (2006.01)
(Continued)

(52) U.S. Cl.
CPC ............. *F25B 1/053* (2013.01); *F25B 49/025* (2013.01); *F25B 1/10* (2013.01); *F25B 25/005* (2013.01); *F25B 40/02* (2013.01); *F25B 2339/047* (2013.01); *F25B 2341/0662* (2013.01); *F25B 2400/072* (2013.01); *F25B 2400/13* (2013.01); *F25B 2400/23* (2013.01); *F25B 2500/19* (2013.01); *F25B 2600/021* (2013.01);
(Continued)

(58) Field of Classification Search
CPC ................ F25B 2600/02; F25B 49/022; G06F 17/5018; G06F 17/5036; G06F 17/5009; G06F 2217/16; G05B 17/0522

USPC .................................. 62/228.1, 115; 700/182
See application file for complete search history.

(56) References Cited

U.S. PATENT DOCUMENTS

| 2010/0170274 | A1 | 7/2010 | Ueda | |
|---|---|---|---|---|
| 2011/0120162 | A1* | 5/2011 | Ueda | F25B 1/053 62/228.1 |
| 2012/0029889 | A1* | 2/2012 | Togano | F25B 1/053 703/2 |

FOREIGN PATENT DOCUMENTS

| CN | 102384855 A | 3/2002 |
|---|---|---|
| CN | 102072604 A | 5/2011 |

(Continued)

OTHER PUBLICATIONS

Extended European Search Report dated Mar. 11, 2014, issued in corresponding European Patent Application No. 12178839.2 (5 pages).

(Continued)

*Primary Examiner* — Keith M Raymond
*Assistant Examiner* — Meraj A Shaikh
(74) *Attorney, Agent, or Firm* — Westerman, Hattori, Daniels & Adrian, LLP

(57) ABSTRACT

A calculating section 103 calculates a target COP that is a maximum COP that the centrifugal chiller can achieve using an arithmetic expression in which an actual device loss is given as a correction term to an expression that represents a COP characteristic under an ideal lossless environment. Since the arithmetic expression for calculating the target COP includes the heat exchange loss of the evaporator as a correction term, the heat exchange loss being calculated using a function having a load factor as a parameter, the heat exchange loss of the evaporator is reflected in the target COP.

3 Claims, 4 Drawing Sheets

(51) Int. Cl.
*F25B 1/053* (2006.01)
*F25B 1/10* (2006.01)
*F25B 25/00* (2006.01)
*F25B 40/02* (2006.01)

(52) U.S. Cl.
CPC ... *F25B 2700/195* (2013.01); *F25B 2700/197* (2013.01); *F25B 2700/21161* (2013.01); *F25B 2700/21163* (2013.01); *F25B 2700/21171* (2013.01); *Y02B 30/741* (2013.01)

(56) References Cited

FOREIGN PATENT DOCUMENTS

| CN | 102345950 A | 2/2012 |
| EP | 1 701 112 A1 | 9/2006 |
| EP | 2 330 365 A2 | 6/2011 |
| JP | 1-102254 A | 4/1989 |
| JP | 11-023113 A | 1/1999 |
| JP | 2006-283998 A | 10/2006 |
| JP | 2009-2576 A | 1/2009 |
| JP | 2011-106699 A | 6/2011 |
| JP | 2011-106792 A | 6/2011 |
| JP | 2011-141097 A | 7/2011 |
| JP | 2012-32055 A | 2/2012 |
| KR | 10-2004-0042734 A | 5/2004 |
| KR | 20040042734 A * | 5/2004 |
| WO | 2008/142714 A1 | 11/2008 |
| WO | 2010/061624 A1 | 6/2010 |

OTHER PUBLICATIONS

Chinese Office Action dated Mar. 19, 2014, issued in corresponding Chinese Patent Application No. 201210258170.0, w/English translation (8 pages).

Chinese Notice of Allowance dated Sep. 9, 2014, for Chinese Application No. 201210258170.0; (4 pages) The Notice of Allowance has been received.

Korean Office Action dated Oct. 10, 2013, issued in corresponding Korean Patent Application No. 10-2012-0078160 with English translation (6 pages).

* cited by examiner

APPARATUS AND METHOD FOR EVALUATING PERFORMANCE OF CENTRIFUGAL CHILLER

CROSS REFERENCE TO RELATED APPLICATIONS

This application claims the benefit of Japanese Patent Application No. 2011-171152, the content of which is incorporated herein by reference.

TECHNICAL FIELD

The present invention relates to an apparatus and method for evaluating the performance of a centrifugal chiller.

BACKGROUND ART

A known method in the related art for evaluating the performance of a centrifugal chiller is disclosed in PTL 1. PTL 1 discloses a method for calculating a maximum COP (hereinafter referred to as "target COP") that a centrifugal chiller can achieve by adding a correction factor that represents the compressor characteristics to an expression that represents the reverse Carnot cycle in view of the fact that a COP characteristic under an ideal lossless environment approximates the reverse Carnot cycle.

CITATION LIST

Patent Literature

{PTL 1} Japanese Unexamined Patent Application, Publication No. 2011-106792

SUMMARY OF INVENTION

Technical Problem

The method for calculating a target COP disclosed in PTL 1 is based on the technical idea that an actual device loss is given as a correction term to a COP characteristic under an ideal lossless environment expressed by the expression for the reverse Carnot cycle.

Although the method disclosed in PTL 1 gives a device loss due to the compressor as a correction factor Cf with a relative load factor as a parameter, losses due to devices that constitute the centrifugal chiller, other than the compressor, for example, heat exchangers, such as an evaporator and a condenser, are given as a constant value by a term for loss-equivalent temperature difference Td.

An object of the present invention is to provide an apparatus and method for evaluating the performance of a centrifugal chiller, in which, when calculating a target COP by giving an actual device loss as a correction term to a COP characteristic under an ideal lossless environment, a loss-equivalent temperature difference depending on the performance of the evaporator is given so that the accuracy of calculation of the target COP is improved.

Solution to Problem

The present invention provides an apparatus for evaluating the performance of a centrifugal chiller equipped with a compressor and an evaporator serving as a heat exchanger, the apparatus comprising a calculating section for calculating a target COP that is a maximum COP that the centrifugal chiller can achieve by using an arithmetic expression in which an actual device loss is given as a correction term to an expression that represents a COP characteristic under an ideal lossless environment, wherein the arithmetic expression includes heat exchange loss of the evaporator as the correction term, and wherein the heat exchange loss of the evaporator is calculated using a function having a load factor as a parameter.

According to the present invention, a target COP that is a maximum COP that the centrifugal chiller can achieve is calculated by using an arithmetic expression in which an actual device loss is given as a correction term to an expression that represents a COP characteristic under an ideal lossless environment. In this case, since the arithmetic expression includes the heat exchange loss of the evaporator as the correction term, and the heat exchange loss of the evaporator is expressed as a function having a load factor as a parameter, the calculation of the target COP can reflect the heat exchange loss of the evaporator that depends on the load factor. This can improve the accuracy of calculation of the target COP.

In the apparatus for evaluating the performance of a centrifugal chiller, preferably, the function for calculating the heat exchange loss of the evaporator is derived from relationships between the load factor and the heat exchange loss of the evaporator obtained at individual cooling-water inlet temperatures.

Since the relationships between the load factor and the heat exchange loss of the evaporator are obtained at individual cooling-water inlet temperatures, and the heat exchange loss of the evaporator is calculated using a function derived from the relationships, the heat exchange loss of the evaporator can be obtained with high reliability.

In the apparatus for evaluating the performance of a centrifugal chiller, the function may be given by a function approximating a plurality of characteristics showing the relationships between the load factor and the heat exchange loss of the evaporator at the individual cooling-water inlet temperatures to a single characteristic.

This allows the heat exchange loss of the evaporator to be uniquely determined from the load factor by using a single characteristic irrespective of the cooling-water inlet temperature, in other words, the adiabatic head of a centrifugal compressor. The above function is a function such that, for example, the higher the load factor, the larger the heat exchange loss of the evaporator.

In the apparatus for evaluating the performance of a centrifugal chiller, the COP characteristic under the ideal lossless environment may be expressed by an expression that represents a reverse Carnot cycle.

The use of the expression that represents the reverse Carnot cycle as an expression that represents the COP characteristic under the ideal lossless environment can simplify the expression for calculating the target COP, thus shortening the time necessary for calculating the target COP and reducing the processing load.

In the apparatus for evaluating the performance of a centrifugal chiller, the arithmetic expression may be given a mechanical loss due to the performance of the compressor as the correction term.

Since the arithmetic expression for calculating the target COP is given a mechanical loss due to the performance of the compressor as a correction term, the mechanical loss due to the compressor can be reflected in the target COP. This allows the accuracy of calculation of the target COP to be further improved.

The present invention provides a method for evaluating the performance of a centrifugal chiller equipped with a compressor and an evaporator serving as a heat exchanger, the method comprising a calculation step of calculating a target COP that is a maximum COP that the centrifugal chiller can achieve by using an arithmetic expression in which an actual device loss is given as a correction term to an expression that represents a COP characteristic under an ideal lossless environment, wherein the arithmetic expression includes heat exchange loss of the evaporator as the correction term, and wherein the heat exchange loss of the evaporator is calculated using a function having a load factor as a parameter.

Advantageous Effects of Invention

The present invention provides an advantage in that the accuracy of calculation of a target COP can be improved.

DESCRIPTION OF EMBODIMENTS

An embodiment of an apparatus for evaluating the performance of a centrifugal chiller according to the present invention will be described hereinbelow with reference to the drawings. In this embodiment, a description is given of a case where the apparatus for evaluating the performance of a centrifugal chiller is provided in a control unit that controls the centrifugal chiller. Although the following description is given using a variable-speed centrifugal chiller as an example, the apparatus for evaluating the performance of a centrifugal chiller according to the present invention can be applied not only to the variable-speed centrifugal chiller but also to a fixed-speed centrifugal chiller.

Figure 1:
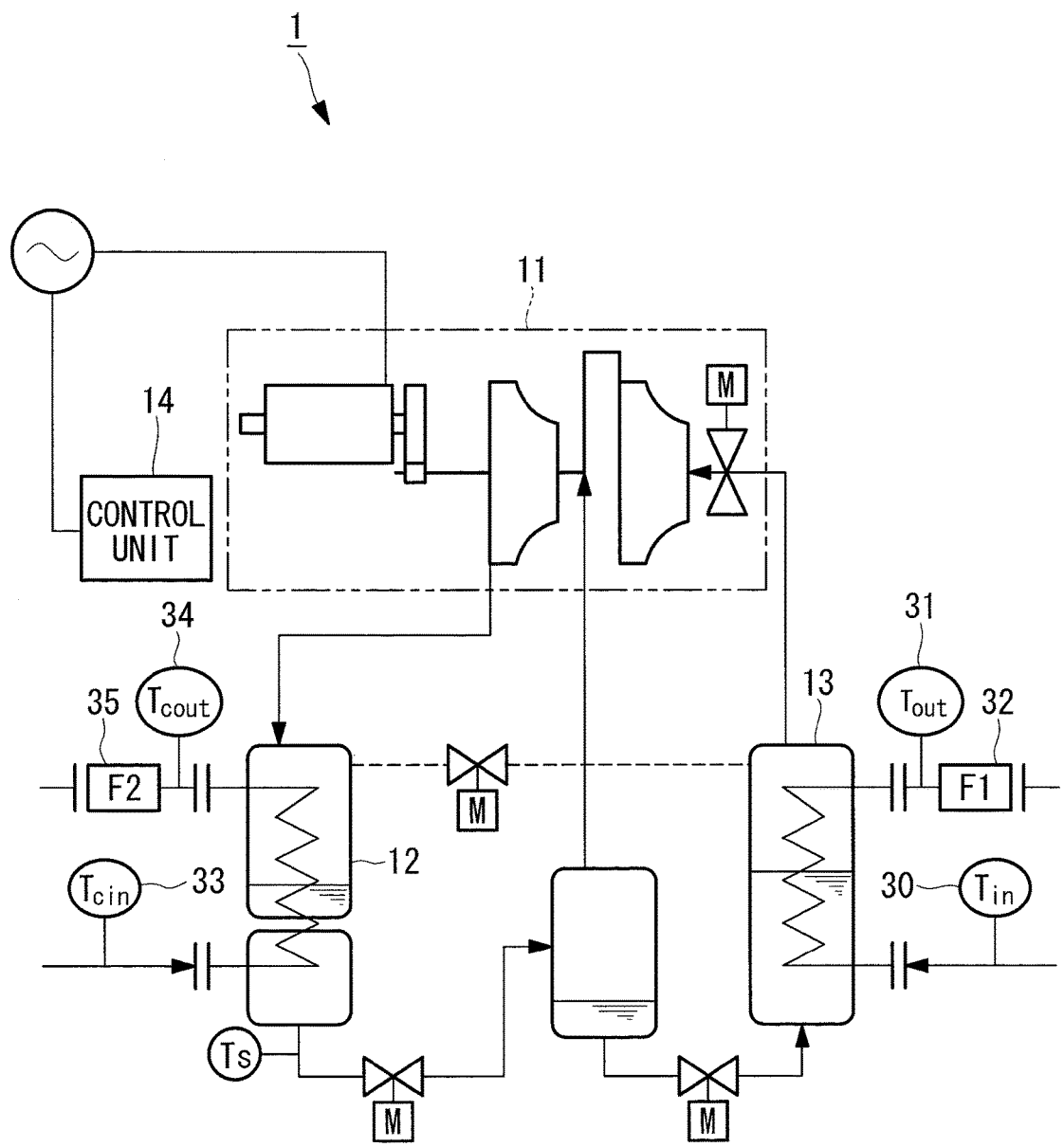
FIG. 1 is a diagram showing, in outline, the configuration of a variable-speed centrifugal chiller according to an embodiment of the present invention.

FIG. 1 is a diagram showing, in outline, the configuration of a variable-speed centrifugal chiller 1. As main components, the variable-speed centrifugal chiller 1 is equipped with a turbo-compressor 11 that compresses refrigerant, a condenser 12 that condenses a high-temperature, high-pressure gas refrigerant compressed by the turbo-compressor 11, an evaporator 13 that evaporates liquid refrigerant that has passed through the condenser 12, and a control unit 14 that controls the variable-speed centrifugal chiller 1.

The variable-speed centrifugal chiller 1 is further provided with a temperature sensor 30 that measures a chilled water inlet temperature Tin, a temperature sensor 31 that measures a chilled water outlet temperature Tout, a flow rate sensor 32 that measures a chilled water flow rate F1, a temperature sensor 33 that measures a cooling-water inlet temperature Tcin, a temperature sensor 34 that measures a cooling-water outlet temperature Tcout, a flow rate sensor 35 that measures a cooling-water flow rate F2, and so on. Measured values from the sensors 30 to 35 are transmitted to the control unit 14.

The configuration of the variable-speed centrifugal chiller 1 shown in FIG. 1 is merely an example, and the present invention is not limited to this configuration. For example, it may be configured such that an air heat exchanger is disposed instead of the condenser 12, so that heat is exchanged between cooled outside air and the refrigerant. The variable-speed centrifugal chiller 1 is not limited to the case where only the cooling function is provided; for example, it may have only a heating function or both the cooling function and the heating function.

The control unit 14 has a function for controlling the rotational speed of the turbo-compressor 11 on the basis of the measured values received from the sensors, a load factor sent from a host system, and so on, as well as a function for evaluating the performance of the centrifugal chiller 1.

The control unit 14 is constituted by, for example, a central processing unit (CPU), a random access memory (RAM), and a computer-readable recording medium (not shown). A series of processes for implementing various functions, described later, is recorded in the recording medium or the like in the form of a program. The CPU reads the program into the RAM or the like and executes information processing and calculation processes to implement the various functions described later.

Figure 2:
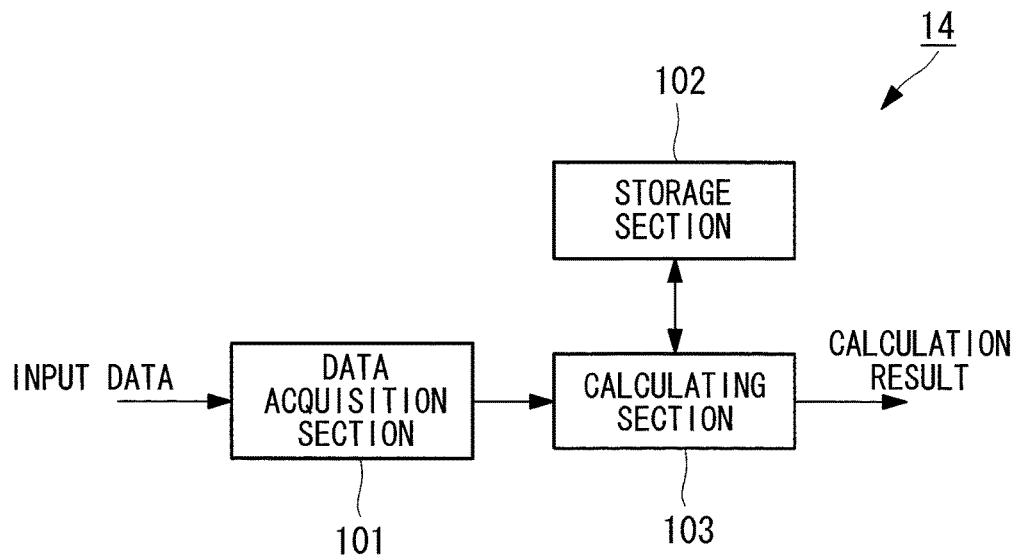
FIG. 2 is a functional block diagram showing, in expanded form, the functions of an apparatus for evaluating the performance of the variable-speed centrifugal chiller according to an embodiment of the present invention.

FIG. 2 is a functional block diagram showing, in expanded form, functions related to performance evaluation of the functions of the control unit 14. As shown in FIG. 2, the control unit 14 is equipped with a data acquisition section 101, a storage section 102, and a calculating section 103.

The data acquisition section 101 acquires operating data of the variable-speed centrifugal chiller 1 as input data. Examples of the operating data include the chilled water inlet temperature Tin measured by the temperature sensor 30, the chilled water outlet temperature Tout measured by the temperature sensor 31, the cooling-water inlet temperature Tcin measured by the temperature sensor 33, the cooling-water outlet temperature Tcout measured by the temperature sensor 34, and the present load factor.

The storage section 102 stores arithmetic expressions for calculating a target COP, which is the maximum COP that the variable-speed centrifugal chiller 1 can achieve, at each operating point, and so on. The arithmetic expressions stored in the storage section 102 are described below.

$$COP_{cf} = \{(Tout+273.15)/(Tcout-Tout+Td)\}/Cf \quad (1)$$

Equation (1) is a arithmetic expression in which an actual device loss is given as correction terms Cf and Td to a COP characteristic (hereinafter referred to as "actual-device ideal COP") under an ideal lossless environment represented by the expression for the reverse Carnot cycle. The use of Equation (1) allows a target $COP_{cf}$ to be calculated.

In Equation (1), the correction term Cf is a correction term for reflecting a device loss due to the device characteristics of the turbo-compressor 11 in the actual-device ideal COP, and Td is a correction term for reflecting a loss-equivalent temperature difference due to the evaporator 13 and the condenser 12 in the actual-device ideal COP. Tout is the chilled water outlet temperature, and Tcout is the cooling-water outlet temperature, for which the measured values from the temperature sensors 31 and 34 are substituted.

Specifically, the correction term Cf is obtained by the following Equation (2):

$$Cf = f(Qfr) \quad (2)$$

Here, Qfr is expressed as the following Equation (3):

$$Qfr = Qf/Qr \quad (3)$$

Equation (3) above is an arithmetic expression derived on the basis of the device characteristics of the turbo-compressor 11, which is an arithmetic expression for calculating a relative load factor Qfr that expresses, as a relative value, the present load factor at the difference between the present cooling-water outlet temperature and the present chilled water outlet temperature relative to a predetermined load factor, set as an operating reference, at the difference between a predetermined cooling-water outlet temperature and a predetermined chilled water outlet temperature. In Equation (3), Qf is the present load factor, and Qr is given by the following Equation (4):

$$Qr = \varphi/\mu a d^{1/2} \times (Had/k_{100})^{1/2} = 0.1 \times (Had/19.4)^{1/2} \quad (4)$$

Had in Equation (4) is given by the following Equation (5) from the thermodynamic characteristics.

$$Had = (-2.7254 \times 10^{-4} Tout^2 - 9.0244 \times 10^{-3} Tout + 47.941) \times \{\log_{10} Pc - \log_{10} Pe\} \times 1000/9.8067 \quad (5)$$

In Equation (5) above, Pc is the saturated pressure [MPa] of the condenser 12, Pe is the saturated pressure [MPa] of the evaporator 13, and Tout is a chilled water outlet temperature [° C.].

The correction term Td can specifically be given by the following Equation (6).

$$Td = Tde + Tdc \quad (6)$$

In Equation (6), Tde is a loss-equivalent temperature difference in which the heat exchange loss of the evaporator 13 is considered, and Tdc is a loss-equivalent temperature difference in which the heat exchange loss of the condenser 12 is considered. The loss-equivalent temperature difference Tde in which the heat exchange loss of the evaporator 13 is considered is one of the main features of the present invention, and a method for deriving it will be described later in detail. For the loss-equivalent temperature difference in which the heat exchange loss of the condenser 12 is considered, an appropriate value is set from the relationship between the load factor and the loss-equivalent temperature difference, and the value may be employed as a constant, or alternatively, it may be calculated using a predetermined function having the load factor and so on as parameters.

As described above, the storage section 102 stores accompanying arithmetic expressions for calculating various parameters used in these arithmetic expressions, in addition to the arithmetic expressions that mainly function to calculate a target COP.

When input data is acquired by the data acquisition section 101, the calculating section 103 reads various arithmetic expressions from the storage section 102 and calculates a target COP at the present operating point by using the arithmetic expressions. Specifically, the calculating section 103 obtains a correction term Cf corresponding to the present operating point by using Equations (2) to (5) and obtains a correction term Td corresponding to the present operating point by using Equation (6). By substituting the obtained correction terms Cf and Td into Equation (1), a target COP corresponding to the present operating point is obtained.

Next, a method for deriving the loss-equivalent temperature difference in which the heat exchange loss of the evaporator 13 is considered in Equation (6) will be described with reference to FIG. 3 to FIG. 5B. Here, the evaporator 13 according to this embodiment is a flooded evaporator, into which refrigerant liquid that is reduced in pressure by an expansion valve flows, and in which heat is exchanged between the refrigerant liquid and chilled water or brine passing through a tube. The heat exchange causes the refrigerant liquid to evaporate, and the latent heat of evaporation thereof causes the chilled water or brine passing through the tube to be cooled.

Here, a general equation for the heat exchange in the evaporator 13 will be expressed as Equation (7).

$$Q = K \times A \times \Delta Tm \quad (7)$$

In the above Equation (7), Q is the quantity of heat exchanged (kW), K is an average heat-transfer coefficient (kW/m²·K), A is an effective heat-transfer area (m²), and ΔTm is an average temperature difference (K), which is given by the following Equation (8).

$$\Delta Tm = (\Delta T1 + \Delta T2)/2 \quad (8)$$

where ΔT1=chilled water inlet temperature−evaporation temperature=Tw1−Te(K) and

ΔT2=chilled water outlet temperature−evaporation temperature=Tw2−Te(K).

In the case where the average heat-transfer coefficient K and the effective heat-transfer area A are constant in the above Equation (7), if the chilled water inlet temperature Tw1 and the chilled water outlet temperature Tw2 are given, the evaporation temperature Te is uniquely determined relative to the heat exchange rate Q. In the case where the average heat-transfer coefficient K and the effective heat-transfer area A are constant, the heat-transfer driving force that drives heat exchange is the temperature difference between the refrigerant liquid and the chilled water or brine flowing through the tube. Therefore, the larger the heat exchange rate Q is, the larger heat-transfer driving force, in other words, the larger temperature difference, that is needed.

Figure 3:
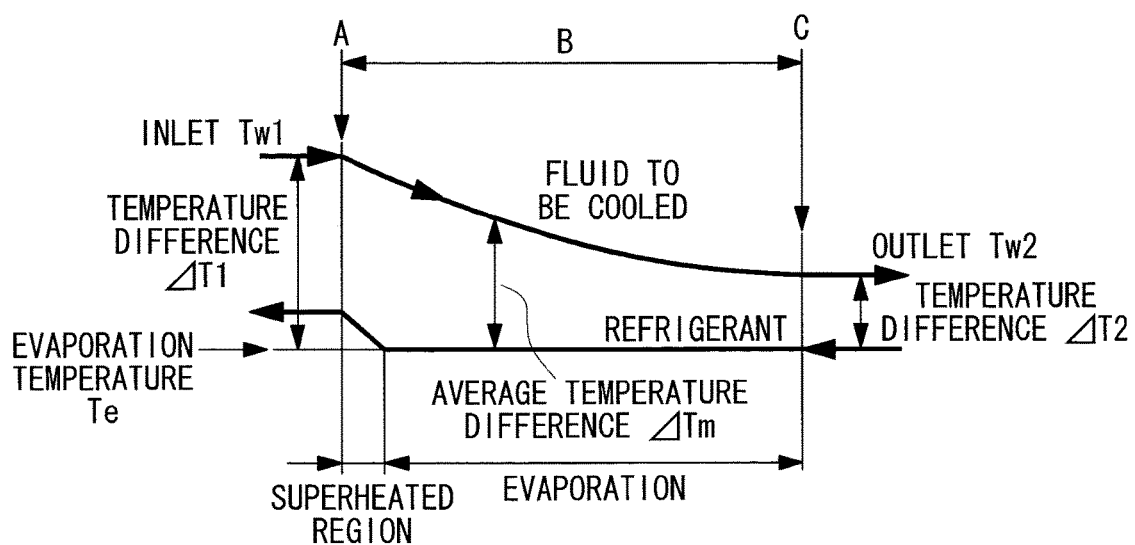
FIG. 3 is a diagram showing the state of heat transfer of a flooded evaporator.

FIG. 3 is a diagram showing the state of heat transfer of the flooded evaporator 13. In FIG. 3, the evaporation temperature is constant at a predetermined value Te. FIG. 3 shows that chilled water at a temperature Tw1 at the inlet of the evaporator 13 (point A in FIG. 3) is gradually cooled by exchanging heat with cooling water in the evaporator 13 (region B in FIG. 3) and is cooled to a temperature Tw2 at the outlet of the evaporator 13 (point C in FIG. 3). This shows that the smaller the temperature difference ΔT2 between the chilled water outlet temperature Tw2 and the evaporation temperature Te, the smaller the heat exchange loss of the evaporator 13.

The inventors assumed that the heat exchange loss of the evaporator 13 depends on the load factor, more specifically, the higher the load factor is, the larger heat exchange loss of the evaporator 13 is, from the empirical finding that the larger the load factor is, the larger the temperature difference ΔT2 between the chilled water outlet temperature Tw2 and the evaporation temperature Te is, and actually conducted an experiment to verify the relationship between the load factor and the heat exchange loss of the evaporator 13.

Figure 4:
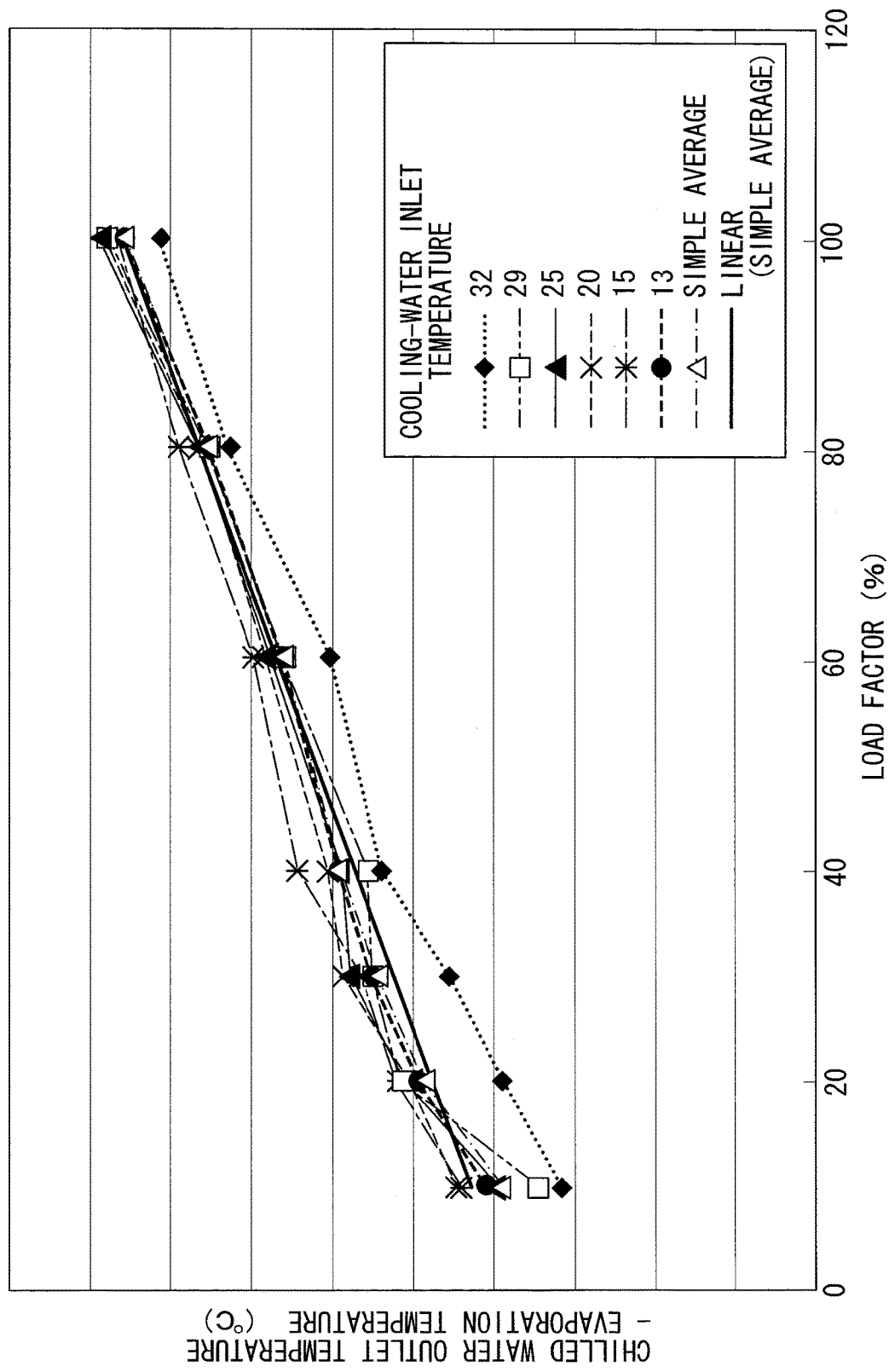
FIG. 4 is a diagram showing the relationships between the load factor and the heat exchange loss of the evaporator at different cooling-water inlet temperatures.

FIG. 4 is a diagram showing the relationships between the load factor and the heat exchange loss of the evaporator 13 at various cooling-water inlet temperatures. In FIG. 4, the horizontal axis indicates the load factor, and the vertical axis indicates the heat exchange loss of the evaporator 13, which is expressed as the difference between the chilled water outlet temperature and the evaporation temperature. FIG. 4 shows the individual relationships when the cooling-water inlet temperature was set at 13° C., 15° C., 20° C., 25° C., 29° C., and 32° C.

As shown in FIG. 4, it was verified that the larger the load factor is, the larger the heat exchange loss of the evaporator 13 is.

Here, although it was predicted that the heat exchange loss in a partial-load region, in particular, a low-load region, for example, at a load factor of 20%, will show a smaller value (that is, a smaller value on the Y-axis in the graph shown in FIG. 4), the experiment showed that it does not show so small a value, contrary to the prediction.

This was examined, and a new finding was obtained that performance degradation due to a decrease in effective heat-transfer area occurs in a region in which the load factor is lower than a predetermined value.

Figure 5A:
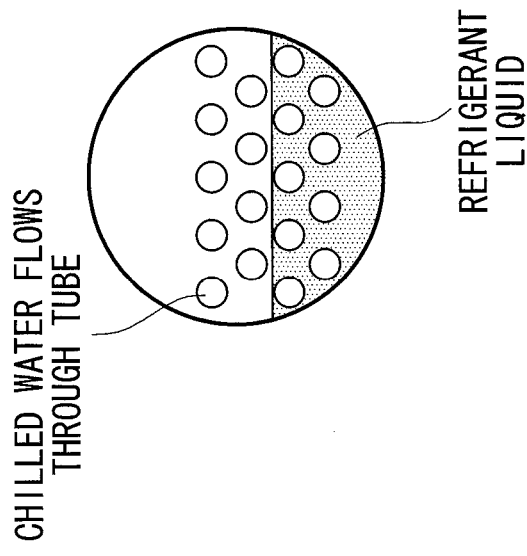
FIG. 5A is a diagram for explaining the state of a tube and refrigerant liquid of the evaporator, showing the state of the tube and the refrigerant liquid with a load factor of 100%.
Figure 5B:
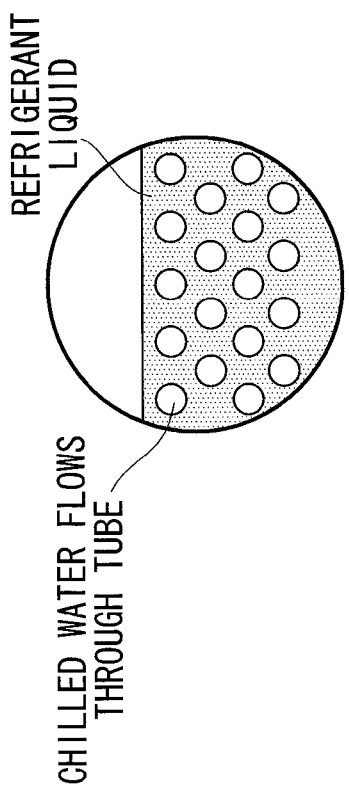
FIG. 5B is a diagram for explaining the state of the tube and the refrigerant liquid of the evaporator, showing the state of the tube and refrigerant liquid under a partial load.

For example, as shown in FIG. 5A, at a load factor of 100%, the froth surface of the refrigerant rises due to the volume of the refrigerant that evaporates into gas, so that heat exchange is performed, with the entire tube in contact with the refrigerant liquid. On the other hand, as shown in FIG. 5B, under a partial load, the amount of circulating refrigerant and the amount of refrigerant that evaporates into gas are reduced, so that the level of the refrigerant liquid in the evaporator 13 falls, and thus, the effective heat-transfer area of the tube, in terms of an area in contact with the refrigerant liquid, decreases.

Furthermore, the inventors conducted an experiment on the heat exchange performance of the evaporator 13 at the individual operating points, focusing on changes in effective heat-transfer area. The results showed that a 20% decrease in effective heat-transfer area relative to a given effective heat-transfer area causes the average temperature difference $\Delta Tm$ necessary for ensuring the heat exchange rate Q to increase by 1.2 times, in other words, causes the heat exchange performance to decrease.

This showed that the relationships between the load factor and the heat exchange loss of the evaporator 13, shown in FIG. 4, also include changes in heat exchange performance that depends on the effective heat-transfer area.

An examination on the relationships between the load factor and the heat exchange loss of the evaporator 13 at the individual cooling-water inlet temperatures shown in FIG. 4 showed that the tendency for the heat exchange loss of the evaporator 13 to increase with an increasing load factor does not change even if the cooling-water inlet temperature changes and that the characteristics at the individual cooling-water inlet temperatures are substantially the same. That is, the relationship between the load factor and heat exchange loss of the evaporator 13 does not depend on the cooling-water inlet temperature, and hence it is expressed by a single function.

Thus, the characteristics that show the relationships between the load factor and the heat exchange loss of the evaporator 13 at the individual cooling-water inlet temperatures are expressed as an approximate curve, and the loss-equivalent temperature difference Tde of the evaporator 13 in Equation (6) is calculated using this characteristic. This has an advantage in that the loss-equivalent temperature difference Tde of the evaporator 13 can be obtained by using the common characteristic irrespective of the cooling-water inlet temperature.

In this embodiment, the mean value of heat exchange losses at the individual cooling-water inlet temperatures at the individual load factors is calculated, and an approximate expression passing through the calculated mean value is created. The approximate expression is given by, for example, the following Equation (9).

$$Tde = a \times Qf + b \qquad (9)$$

In Equation (9), Tde is the loss-equivalent temperature difference of the evaporator 13, Qf is the present load factor, and a and b are constants. Although Equation (9) is expressed as a linear function having the load factor as a parameter, it may be expressed as a polynomial.

Next, the operation of the apparatus for evaluating the performance of a centrifugal chiller according to this embodiment will be described.

First, the data acquisition section 101 acquires operating data of the variable-speed centrifugal chiller 1 as input data and outputs the acquired input data to the calculating section 103. The calculating section 103 calculates a target COP at the present operating point by using the foregoing arithmetic expressions stored in the storage section 102 and the operating data input from the data acquisition section 101.

Specifically, a correction term Cf corresponding to the present operating point is obtained by using the foregoing Equations (2) to (5), and the heat exchange loss Td of the heat exchangers is calculated by using Equations (6) and (9). More specifically, the present load factor is substituted for Qf in Equation (9) to calculate the loss-equivalent temperature difference Tde of the evaporator 13, and the calculated loss-equivalent temperature difference Tde of the evaporator 13 is substituted into Equation (6) to obtain the loss-equivalent temperature difference Td due to the evaporator 13 and the condenser 12.

After the correction terms Cf and Td are obtained, the correction terms are substituted into Equation (1) to calculate a target COP corresponding to the present operating point.

The calculated COP is transmitted to a monitoring unit (not shown) via a communication medium. In parallel with the foregoing target COP calculation process, the control unit 14 calculates, for example, the amount of heat output, an actual measured COP (a value obtained by dividing the amount of heat output [kW] by the amount of power consumed [kW]) at the present operating point, and so on, and these calculation results are also transmitted to the monitoring unit via a communication medium.

The monitoring unit displays the target COP, the actual measured COP, the amount of heat output, etc. on a monitor, and these items of information are provided to the user.

As described above, since the apparatus and method for evaluating the performance of a centrifugal chiller according to this embodiment employ the heat exchange loss of the evaporator 13 in which the load factor is considered, as compared with the heat exchange loss of the heat exchanger, which was conventionally given as a constant, the accuracy of calculation of the target COP can be improved. This allows the accuracy of evaluation of the performance of a centrifugal chiller to be improved.

In the foregoing embodiment, although a description is given of the case where the control unit 14 has the function of the apparatus for evaluating the performance of a centrifugal chiller, the apparatus for evaluating the performance of a centrifugal chiller may be a standalone system. In this case, the apparatus for evaluating the performance of a centrifugal chiller receives operating data of the centrifugal chiller from the control unit 14 via a predetermined communication medium and calculates the target COP and so on by using these items of information. The apparatus for evaluating the performance of a centrifugal chiller of the present invention may have this function in the monitoring unit that monitors the operation control of the centrifugal chiller.

REFERENCE SIGNS LIST 1 centrifugal chiller
11 turbo-compressor
12 condenser
13 evaporator
14 control unit
101 data acquisition section
102 storage section
103 calculating section

The invention claimed is:

1. A centrifugal chiller comprising:
a compressor configured to compress a refrigerant;
a condenser configured to perform heat exchange between the refrigerant and cooling water;
an evaporator configured to perform heat exchange between the refrigerant and chilled water; and
a control unit configured to calculate a target COP that is a maximum COP that the centrifugal chiller can achieve by using an following arithmetic expression (1), $$COP_{ct}=\{(Tout+273.15)/(Tcout-Tout+Td)\}/Cf \qquad (1)$$

where $COP_{ct}$ represents the target COP, Tout represents a chilled water outlet temperature, Tcout represents a cooling-water outlet temperature, Td represents a correction term for reflecting heat exchange loss of the evaporator, and Cf represents a correction term for reflecting a device loss due to the device characteristics of the compressor, and the correction term Td is calculated using a function having a load factor as a parameter.

2. The centrifugal chiller according to claim 1, wherein the correction term is derived from relationships between the load factor and the heat exchange loss of the evaporator obtained at individual cooling-water inlet temperatures.

3. The centrifugal chiller according to claim 2, wherein the correction term is given by a function approximating a plurality of characteristics showing the relationships between the load factor and the heat exchange loss of the evaporator at the individual cooling-water inlet temperatures to a single characteristic.

* * * * *